(12) United States Patent
Yuan et al.

(10) Patent No.: US 10,878,537 B2
(45) Date of Patent: Dec. 29, 2020

(54) IMAGE SPLICING METHOD, APPARATUS, TERMINAL, AND STORAGE MEDIUM

(71) Applicant: TENCENT TECHNOLOGY (SHENZHEN) COMPANY LIMITED, Shenzhen (CN)

(72) Inventors: Zijin Yuan, Shenzhen (CN); Weihua Jian, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 89 days.

(21) Appl. No.: 16/396,428

(22) Filed: Apr. 26, 2019

(65) Prior Publication Data

US 2019/0251663 A1 Aug. 15, 2019

Related U.S. Application Data

(63) Continuation of application No. PCT/CN2018/078275, filed on Mar. 7, 2018.

(30) Foreign Application Priority Data

Mar. 22, 2017 (CN) .......................... 2017 1 0176990

(51) Int. Cl.
*G06T 11/00* (2006.01)
*G06T 3/40* (2006.01)
(Continued)

(52) U.S. Cl.
CPC .............. *G06T 3/4038* (2013.01); *G06K 9/46* (2013.01); *G06T 7/11* (2017.01); *G06T 7/13* (2017.01); *G06T 7/593* (2017.01)

(58) Field of Classification Search
CPC ......... G06T 2207/20221; G06T 3/4038; G06T 2200/32; H04N 5/23238
See application file for complete search history.

(56) References Cited

U.S. PATENT DOCUMENTS

| 2014/0099022 | A1 | 4/2014 | McNamer |
| 2015/0036917 | A1 | 2/2015 | Nanri et al. |
| 2017/0293998 | A1* | 10/2017 | Kim .......................... G06T 7/33 |

FOREIGN PATENT DOCUMENTS

| CN | 1801216 A | 7/2006 |
| CN | 101673395 A | 3/2010 |

(Continued)

OTHER PUBLICATIONS

The World Intellectual Property Organization (WIPO) International Search Report for PCT/CN2018/078275 dated May 30, 2018 7 Pages (including translation).

(Continued)

*Primary Examiner* — Brian Werner
(74) *Attorney, Agent, or Firm* — Anova Law Group, PLLC

(57) ABSTRACT

Embodiments of this application disclose an image splicing method and apparatus, a terminal, and a storage medium thereof. The image splicing method includes determining a primary position parameter of a current image according to a first overlapped region in the current image; and projecting the current image to a projection canvas according to the primary position parameter to obtain an initial spliced image, the initial spliced image being obtained by splicing the current image and the neighboring image. The method further includes selecting a partially overlapped region from a second overlapped region of the initial spliced image; calculating a partial position parameter of a partial image region corresponding to the partially overlapped region in the current image; and projecting the current image to the projection canvas again according to the primary position parameter and the partial position parameter, to obtain a target spliced image.

20 Claims, 8 Drawing Sheets

(51) Int. Cl.
*G06T 7/11* (2017.01)
*G06K 9/46* (2006.01)
*G06T 7/13* (2017.01)
*G06T 7/593* (2017.01)

(56) References Cited

FOREIGN PATENT DOCUMENTS

| CN | 101710932 A | 5/2010 |
| CN | 102013110 A | 4/2011 |
| CN | 103279923 A | 9/2013 |
| CN | 103700099 A | 4/2014 |
| CN | 104519340 A | 4/2015 |
| CN | 105096283 A | 11/2015 |
| CN | 105303518 A | 2/2016 |
| CN | 105931185 A | 9/2016 |
| CN | 106504194 A | 3/2017 |
| CN | 106991645 A | 7/2017 |
| WO | 2016047473 A1 | 3/2016 |

OTHER PUBLICATIONS

The State Intellectual Property Office of the People's Republic of China (SIPO) Office Action 1 for 201710176990.8 dated May 29, 2018 7 Pages (including translation).

Bang-Guo Wang, "A Method for Accurate Matching of SIFT Features for Image Mosaic", Journal of Dalian University, vol. 36 No. 3, Jun. 30, 2015 (Jun. 30, 2015), pp. 22-26 6 Pages (including translation).

Bin Sheng et al, "Virtue Plane Mapping: A Method of Rendering into Depth Images", Journal of Software, vol. 19 No. 7, Jul. 31, 2008 (Jul. 31, 2008), pp. 1806-1816. 11 Pages.

* cited by examiner

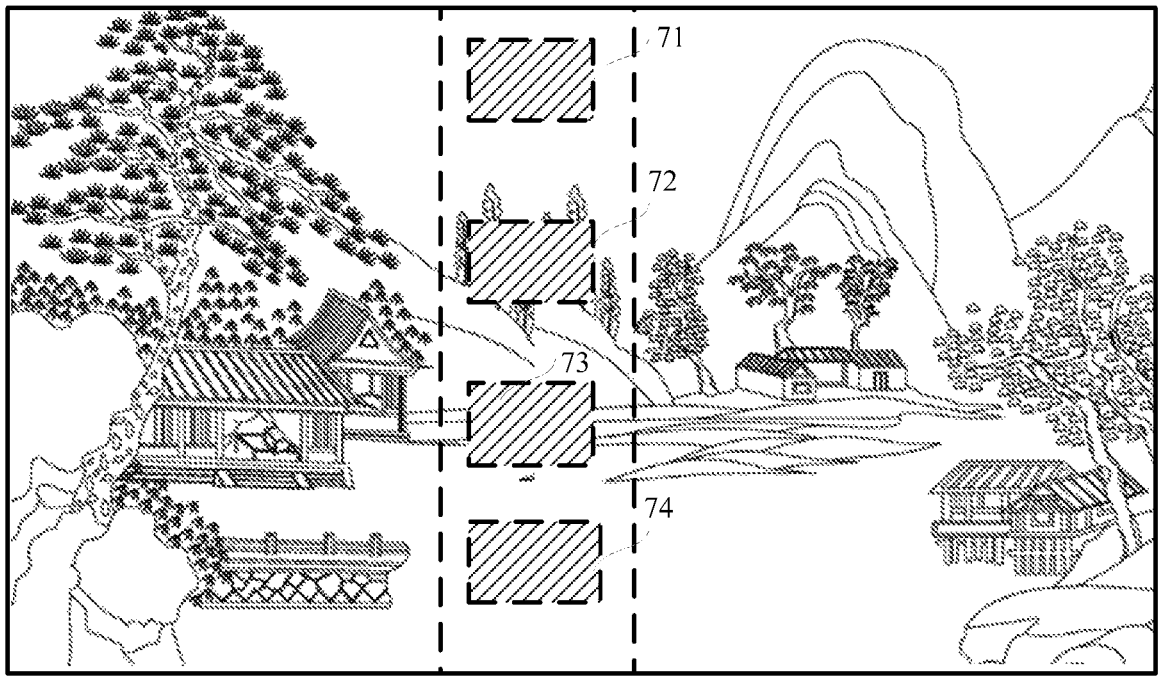

FIG. 7

Calculate a position parameter of each pixel in a first overlapped area according to a partial location parameter — 801

Generate, according to the position parameter of each pixel, a first transform matrix corresponding to the first overlapped area — 802

Generate a second transform matrix of another image area other than the first overlapped area in the current image according to the primary position parameter — 803

Project the current image to the projection canvas according to the first transform matrix and the second transform matrix, to obtain a target spliced image — 804

FIG. 8

IMAGE SPLICING METHOD, APPARATUS, TERMINAL, AND STORAGE MEDIUM

RELATED APPLICATIONS

This application claims priority to PCT Application No. PCT/CN2018/078275, filed on Mar. 7, 2018, which in turn claims priority to Chinese Patent Application No. 201710176990.8, entitled "IMAGE SPLICING METHOD AND APPARATUS" filed with China National Intellectual Property Administration on Mar. 22, 2017. The two applications are incorporated by reference in their entirety.

FIELD OF TECHNOLOGY

Embodiments of this application relate to the field of image processing technologies, and in particular, to an image splicing method and apparatus, a terminal, and a storage medium.

BACKGROUND OF THE DISCLOSURE

Image splicing technologies are widely applied in technical areas such as panoramic photo shooting, space probing, remote sensing image processing, and medical image analysis. Image splicing technology refers to the technology in which two or more than two partially overlapped images are spliced seamlessly, to compose a large-frame or wide-viewing-angle image.

SUMMARY

Embodiments of this application provide an image splicing method and apparatus, a terminal, and a storage medium, to resolve a problem that when a terminal obtains an initial spliced image by projecting an image only according to a primary position parameter. Because the primary position parameter may be inapplicable to the entire image, an overlapped region of the initial spliced image obtained by the terminal cannot achieve desirable effect and an image splicing effect is undesirable. The technical solutions are as follows.

According to one aspect, an image splicing method is implemented on a terminal. The image splicing method includes determining a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image; and projecting the current image to a projection canvas according to the primary position parameter to obtain an initial spliced image, the initial spliced image being obtained by splicing the current image and the neighboring image. The method further includes selecting a partially overlapped region from a second overlapped region of the initial spliced image, the second overlapped region being obtained by fusing the first overlapped region of the current image and the first overlapped region of the neighboring image, and depths of depth planes of objects in the partially overlapped region being the same; calculating a partial position parameter of a partial image region corresponding to the partially overlapped region in the current image, the partial position parameter being used to indicate at least one of a rotation angle and a location of the camera during collection of the partial image region of the current image; and projecting the current image to the projection canvas again according to the primary position parameter and the partial position parameter, to obtain a target spliced image.

According to another aspect, an image splicing apparatus is provided.

The apparatus includes a determining module, configured to determine a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image; and a first projection module, configured to project the current image to a projection canvas according to the primary position parameter obtained by the determining module, to obtain an initial spliced image, the initial spliced image being obtained by splicing the current image and the neighboring image. The apparatus further includes a selection module, configured to select a partially overlapped region from a second overlapped region of the initial spliced image obtained by the first projection module, the second overlapped region being obtained by fusing the first overlapped region of the current image and the first overlapped region of the neighboring image, and depths of depth planes of objects in the partially overlapped region being the same; a calculation module, configured to calculate a partial position parameter of a partial image region corresponding to the partially overlapped region selected by the selection module in the current image, the partial position parameter being used to indicate at least one of a rotation angle and a location of the camera during collection of the partial image region of the current image; and a second projection module, configured to project the current image to the projection canvas again according to the primary position parameter and the partial position parameter calculated by the calculation module, to obtain a target spliced image.

According to another aspect, a terminal for image splicing is provided. The terminal includes a processor and a memory, the memory stores at least one instruction, and the at least one instruction is loaded and executed by the processor to perform the foregoing image splicing method. The method comprising: determining a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image; and projecting the current image to a projection canvas according to the primary position parameter, to obtain an initial spliced image, the initial spliced image being obtained by splicing the current image and the neighboring image. The method further includes selecting a partially overlapped region from a second overlapped region of the initial spliced image, the second overlapped region being obtained by fusing the first overlapped region of the current image and the first overlapped region of the neighboring image, and depths of depth planes of objects in the partially overlapped region being the same; calculating a partial position parameter of a partial image region corresponding to the partially overlapped region in the current image, the partial position parameter being used to indicate at least one of a rotation angle and a location of the camera during collection of the partial image region of the current image; and projecting the current image to the projection canvas again according to the primary position parameter and the partial position parameter, to obtain a target spliced image.

The technical solutions provided in the embodiments of this application have the following beneficial effects. The partially overlapped region is selected from the initial spliced image obtained through projection according to the primary position parameter. The partial position parameter of the partial image region corresponding to the partially overlapped region in the current image is calculated, and the current image is projected to the projection canvas again according to the partial position parameter and the primary position parameter, to obtain the target spliced image. The technical solutions can resolve a problem that when a terminal obtains an initial spliced image by projecting a current image only according to a primary position parameter, because the primary position parameter may be inapplicable to the entire image, an overlapped region of the initial spliced image obtained by the terminal cannot achieve desirable registration and an image splicing effect is undesirable. Because the terminal projects the partial image region to the projection canvas again according to a partial position parameter of each partial image region, when there are many partial image regions, a region corresponding to each partial image region in the target spliced image obtained by the terminal can achieve desirable registration, and an image splicing effect can be improved.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 7 is a schematic diagram of a partially overlapped region according to an embodiment of this application.

FIG. 8 is a flowchart of a method for obtaining a target spliced image according to an embodiment of this application.

DESCRIPTION OF EMBODIMENTS

Exemplary embodiments are described herein in detail and examples hereof are shown in the accompanying drawings. When the following descriptions relate to the accompanying drawings, the same numbers in different accompanying drawings indicate the same or similar elements unless otherwise indicated. Implementations described in the following exemplary embodiments do not indicate all implementations consistent with this application. On the contrary, the implementations are only examples of the apparatus and the method described in the appended claims in detail consistent with some aspects of this application.

Several terms in this specification are first described.

A depth plane is a plane in which an object in an image is located in an actual setting. For example, in an image shown in FIG. 1, a plane in which the head 11 of a person is located is a depth plane 11', and a plane in which the back 12 of a computer is located is a depth plane 12'. Generally, in an image, depths of depth planes of different objects are different, and a depth of a depth plane is a distance between the depth plane and a camera. For example, in the image shown in FIG. 1, a depth of the depth plane 11' and a depth of the depth plane 12' are different, and the depth of the depth plane 11' is greater than the depth of the depth plane 12'.

The projection canvas is a canvas used to present a spliced image when at least two images are spliced. The canvas may be one of the at least two images; or may be another plane other than the at least two images; or may be another cubic surface other than the at least two images, for example, a cylindrical surface and a spherical surface. In this specification, an example in which the projection canvas is another plane other than the at least two images is used for description, but a form of the projection canvas is not limited. The spliced image, for example, a panorama image, is an image obtained by splicing the at least two images.

Figure 2:
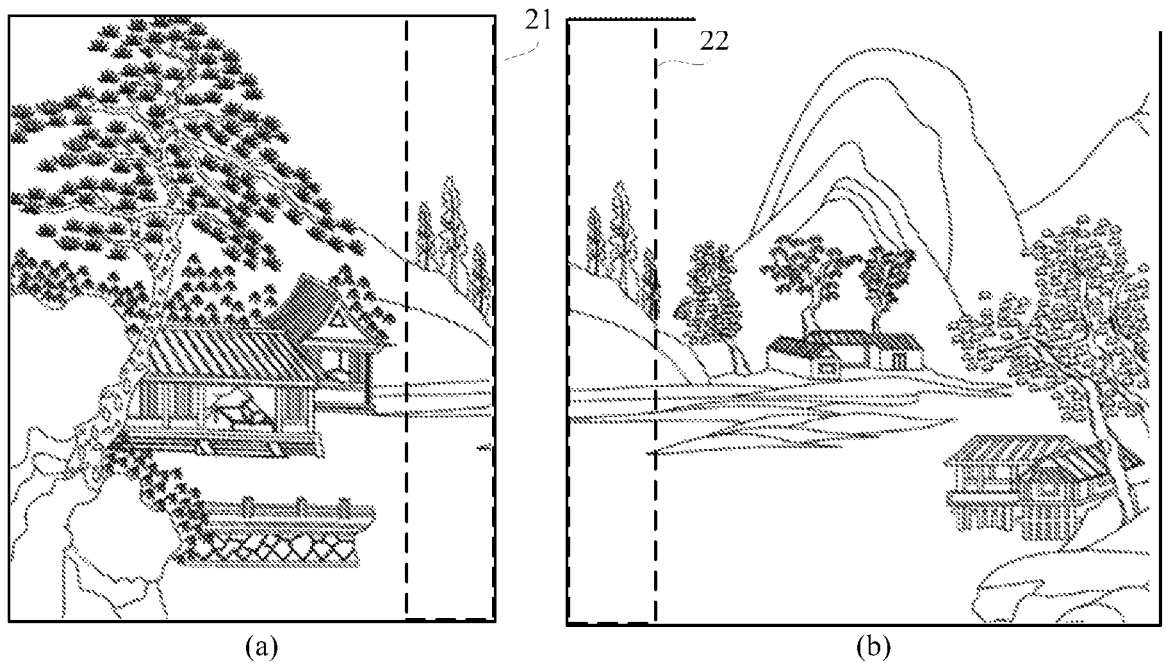
FIG. 2 is a schematic diagram of an overlapped region according to an embodiment of this application.

An overlapped region is a region in which image content of a current image is the same as that of a neighboring image. For example, an image collected by a camera 1 is a current image shown in (a) of FIG. 2, and an image collected by a camera 2 is a neighboring image shown in (b) of FIG. 2. In this case, an overlapped region 21 in the current image is a region in a dashed-line box shown in (a), and an overlapped region 22 in the neighboring image is a region in a dashed-line box shown in (b).

In some applications, an image processing method includes determining, by a terminal, an overlapped region of two images; extracting a feature point from the overlapped region of a current image; calculating, according to the feature point, a position parameter of a first camera that is used to collect the current image; calculating, according to the position parameter, a transformation matrix for projecting the current image to a projection canvas; and projecting the current image to the projection canvas by using the transformation matrix; similarly, performing the foregoing processing for a neighboring image, to obtain a spliced image by splicing two images. The position parameter includes at least one of a rotation angle and a location of the camera during image collection. The current image is one of the two images and the neighboring image is the other of the two images.

When the image has objects in different depth planes, feature points extracted by the terminal may be unevenly distributed in the overlapped region. For example, the collected feature points concentrate in a partially overlapped region of the overlapped region. In this case, the position parameter calculated according to the feature points indicates only a rotation angle and/or a spatial location of the camera during shooting of the partially overlapped region, and is inapplicable to another region other than the partially overlapped region in the overlapped region. In this case, the transformation matrix calculated according to the position parameter cannot ensure desirable registration when another overlapped region of at least two images is projected to the projection canvas, and an effect of an obtained spliced image is undesirable. The depth plane is a plane of an object in an actual setting, and a depth of the depth plane is a distance between the depth plane and the camera.

Figure 1:
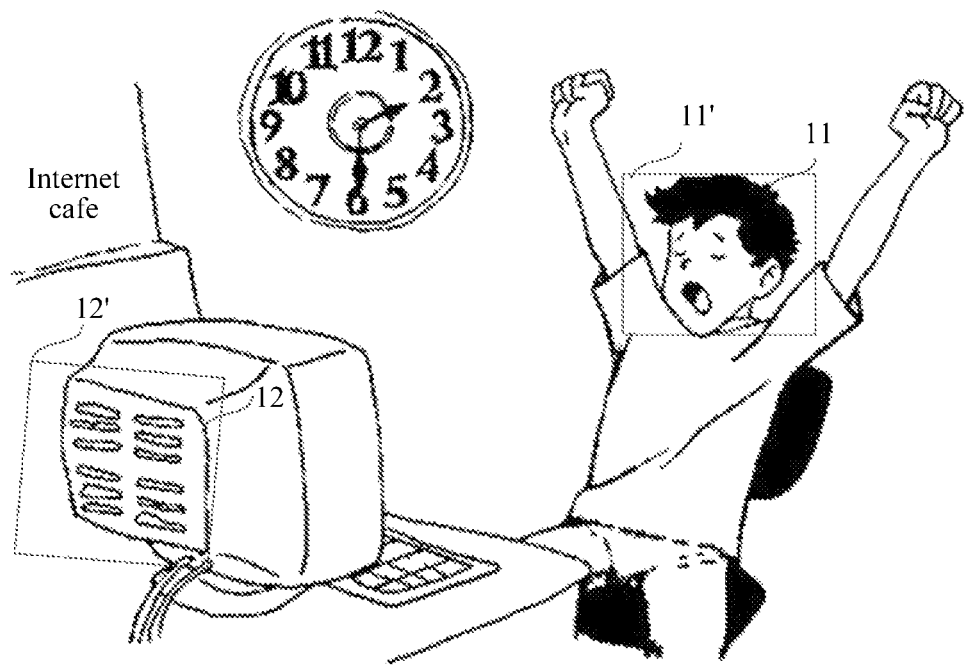
FIG. 1 is a schematic diagram of a depth plane according to an embodiment of this application.

A position parameter is at least one of a rotation angle and a location of a camera during image collection. For example, when the image shown in FIG. 1 is collected, the camera is near a desk of the computer, and the camera rotates downwards by 30 degrees in a vertical direction and does not rotate in a horizontal direction. In some embodiments, the location of the camera may also be indirectly indicated by a translation distance between different cameras. For example, when obtaining an image by using a plurality of cameras, the terminal first estimates space reference coordinates of one of the plurality of cameras according to an image taken by the camera, where the space reference coordinates are used to indicate a location of the camera. The terminal then estimates a distance between another camera and the camera according to a relationship between an image taken by another camera and an image taken by the camera, to obtain spatial location coordinates of another camera. The spatial location coordinates are used to indicate a location of another camera. A representation manner of the position parameter is not limited in this embodiment.

In some embodiments, the neighboring image of the current image is an image with actual content corresponding to the image content is neighboring to an actual setting corresponding to the image content of the current image. In some embodiments, in an actual implementation, an image number of the neighboring image is adjacent to that of the current image, and/or a shooting moment of the neighboring image is close to that of the current image.

Figure 3:
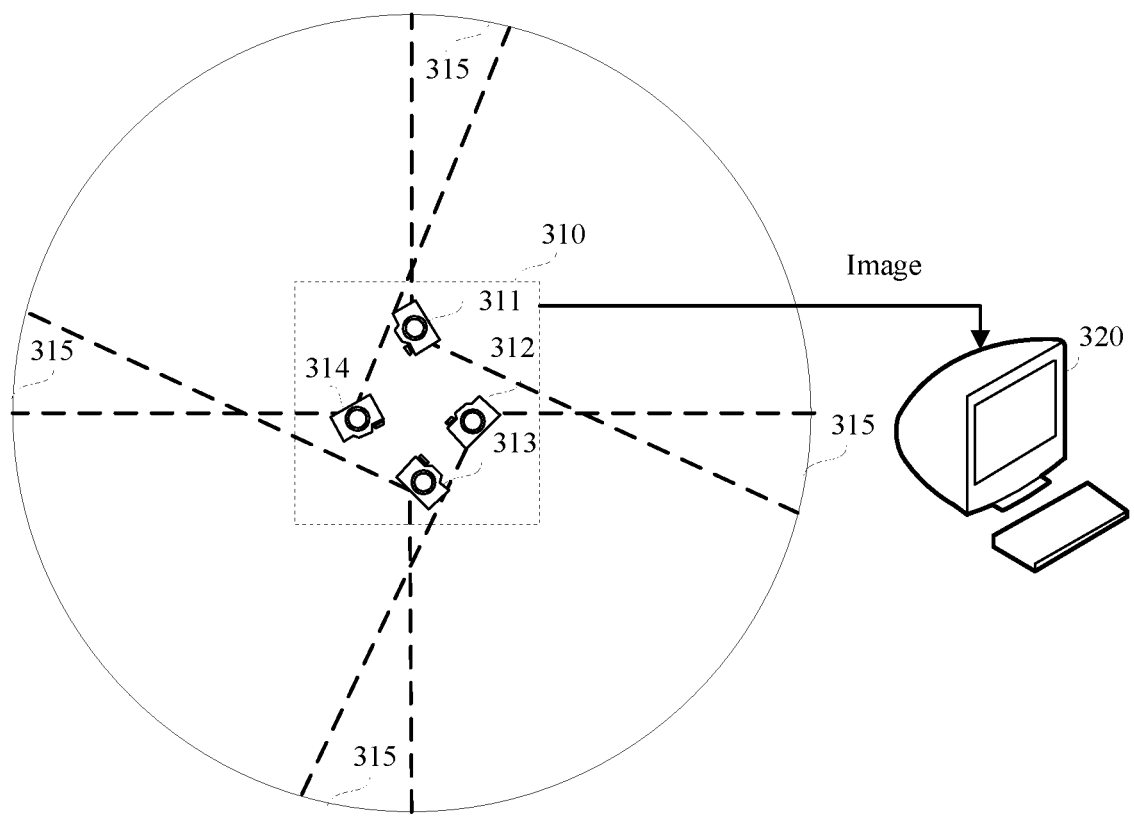
FIG. 3 is a schematic structural diagram of an image splicing system according to an embodiment of this application.

FIG. 3 is a schematic structural diagram of an image splicing system according to an embodiment of this application. The image splicing system includes: an image collection apparatus 310 and a terminal 320.

The image collection apparatus 310 includes electronic devices having a camera lens such as a webcam, a camera, a mobile phone, a tablet computer, or a personal computer (PC).

The image collection apparatus 310 is configured to collect an image, and the image may be a video image (that is, a frame image of video images) or a picture. This is not limited in the embodiment.

In some embodiments, in this embodiment, one image collection apparatus 310 may be configured to collect at least two images; or a plurality of image collection apparatuses 310 may be configured to collect at least two images, and each image collection apparatus 310 collects one image. This is not limited in this embodiment.

When one image collection apparatus 310 collects at least two images, the image collection apparatus 310 collects an image at preset intervals by using different position parameters, where two images collected at two neighboring collection moments have an overlapped region with same image content.

When a plurality of image collection apparatuses 310 collect at least two images, two images collected by two neighboring image collection apparatuses 310 have an overlapped region with same image content. In this case, a position parameter used by each image collection apparatus 310 to collect an image may remain unchanged or may change in real time. This is not limited in this embodiment. In this embodiment, an example in which a plurality of image collection apparatuses 310 collects at least two images is used for description.

For example, in a virtual reality (VR) shooting scene, four cameras perform 360° image collection on a physical environment. A camera 311 collects 0-100° images of the physical environment, a camera 312 collects 90°-190° images of the physical environment, a camera 313 collects 180°-280° images of the physical environment, and a camera 314 collects 270°-10° images of the physical environment. In this way, images collected by two neighboring cameras have a 10° overlapped region 315.

The image collection apparatus 310 establishes a communication connection to the terminal 320 by using a wireless network or a wired network.

The terminal 320 may include a mobile phone, a tablet computer, an eBook reader, a moving picture experts group audio layer III (MP3) player, a moving picture experts group audio layer IV (MP4) player, a laptop portable computer, a desktop computer, or the like. This is not limited in this embodiment.

In some embodiments, a type of the terminal 320 may be the same as that of the image collection apparatus 310, for example, both are mobile phones; or a type of the terminal 320 may be different from that of the image collection apparatus 310, for example, the image collection apparatus 310 is a camera and the terminal 320 is a PC. This is not limited in this embodiment.

The terminal 320 receives, through a communication connection, at least two images sent by the image collection apparatus 310, and splices neighboring images of the at least two images to obtain a spliced image.

When splicing neighboring images, the terminal 320 may splice two neighboring images collected at a same moment, or may splice two neighboring images collected at different moments. This is not limited in this embodiment.

It should be further noted that in this embodiment, only an example in which there is one terminal 320 is used for description. In an actual implementation, there may be a plurality of terminals 320. This is not limited in this embodiment.

In some embodiments, in this embodiment, only an example in which the image collection apparatus 310 and the terminal 320 are independent devices is used for description. In an actual implementation, the image collection apparatus 310 and the terminal 320 may alternatively be disposed in a same device. This is not limited in this embodiment.

In some embodiments, a wireless network or a wired network uses a standard communications technology and/or protocol. A network usually is Internet, but may also be any network including but not limited to any combination of a local region network (LAN), a metropolitan region network (MAN), a wide region network (WAN), a mobile network, a wired or wireless network, a dedicated network, or a virtual dedicated network. In some embodiments, a technology and/or a format such as hypertext mark-up language (HTML) and extensible markup language (XML) is used to represent data exchanged through a network. In addition, a common encryption technology such as Secure Socket Layer (SSL), Transport Layer Security (TLS), a virtual Private network (VPN), and Internet Protocol Security (IPsec) may be used to encrypt some or all links. In some other embodiments, a customized and/or dedicated data communications technology may be used to replace or supplement the data communications technology. In the related art, after obtaining at least two images sent by a camera, the terminal first extracts feature points in the at least two images, and then calculates a position parameter of the camera during image shooting according to the feature points. If feature points extracted by the terminal concentrate in a partial region in an image including a depth plane with a plurality of depths, a position parameter calculated according to the feature points is inapplicable to the entire image, and the calculated position parameter is not sufficiently accurate. As a result, a transformation matrix calculated according to the position parameter is not sufficiently accurate, and a splicing effect of the obtained spliced image is undesirable. To resolve the technical problem, this specification provides the following embodiments.

Figure 4:
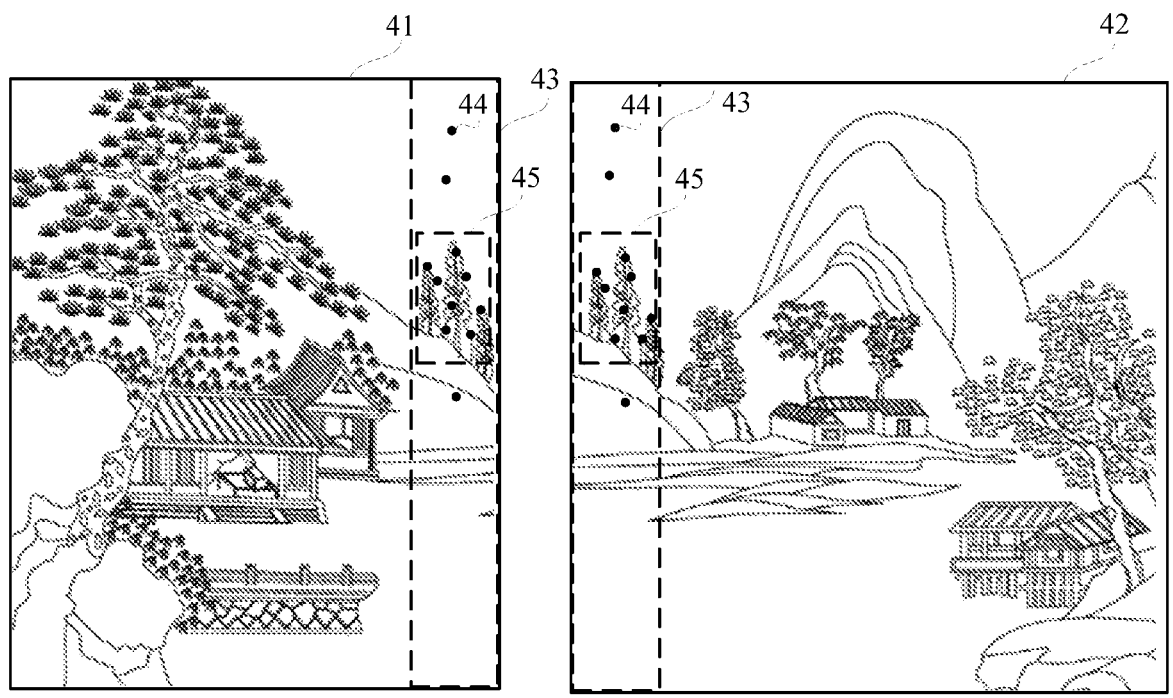
FIG. 4 is a schematic diagram of extracting a feature point according to an embodiment of this application.

Referring to FIG. 4, the terminal 320 extracts a feature point from an overlapped region 43 of an image 41 and an image 42. If the feature point 44 extracted by the terminal 320 is mainly distributed in the partial region 45, a position parameter calculated by the terminal 320 is equivalent to a position parameter corresponding to the partial region 45, and the position parameter may be inapplicable to a region other than the partial region 45 in the overlapped region 43.

In some embodiments, an example in which an execution body of the embodiments is the terminal 320 below is used for description. The terminal 320 has an image splicing function.

Figure 5:
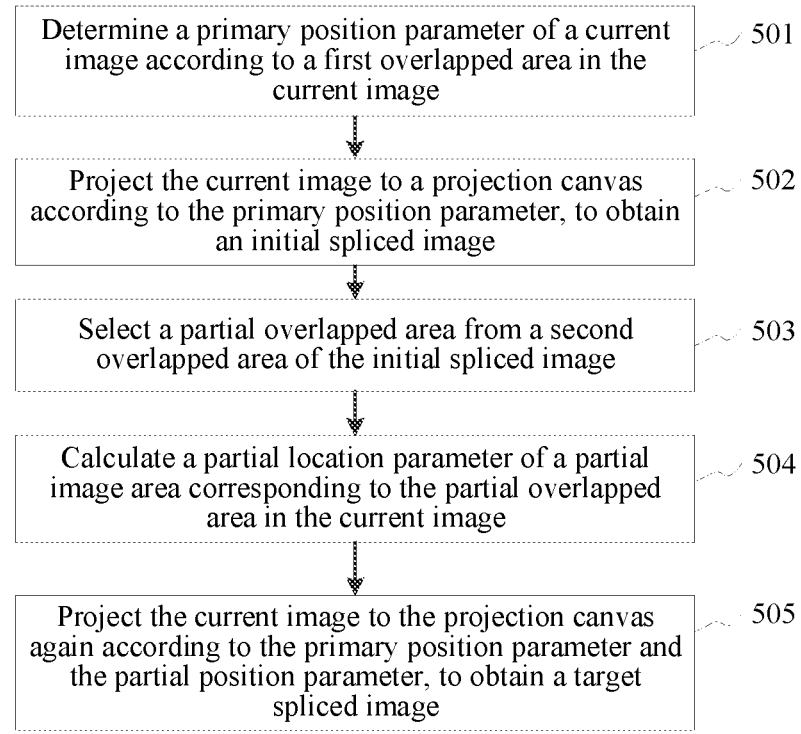
FIG. 5 is a flowchart of an image splicing method according to an embodiment of this application.

FIG. 5 is a flowchart of an image splicing method according to an embodiment of this application. The method is applied to the image splicing system shown in FIG. 3, the method may be performed by the terminal 320, and the method may include the following several steps:

Step 501: Determine a primary position parameter of a current image according to a first overlapped region in the current image.

The first overlapped region is a region in which the image content of the current image is the same as that of the neighboring image, that is, the image content in the first overlapped region is in both the current image and the neighboring image. The first overlapped region is, for example, a region in a dashed-line box 21 in the current image shown in FIG. 2(*a*) and a region in a dashed-line box 22 in the neighboring image shown in FIG. 2(*b*).

In some embodiments, the current image is one of N images obtained by the terminal, and the neighboring image is one of remaining N−1 images. The actual setting corresponding to the image content of the neighboring image is neighboring to the actual setting corresponding to the image content of the current image, and N is an integer greater than 1. In some embodiments, there may also be a plurality of neighboring images. This is not limited in this embodiment.

In some embodiments, in this embodiment, an image being processed by the terminal is referred to as the current image, and an image neighboring to the current image is referred to as the neighboring image. In an actual implementation, the current image and the neighboring image may not be different in names, or the current image and the neighboring image may be named in another naming manner. This is not limited in this embodiment.

The primary position parameter of the current image includes at least one of a rotation angle and a location of a camera during collection of the current image.

The determining, by the terminal, a primary position parameter of a current image according to a first overlapped region in the current image includes: extracting a feature point from the first overlapped region of the current image; and calculating a primary position parameter according to the feature point by using a preset algorithm. The preset algorithm is not limited in this embodiment, and is, for example, a random sample consensus (RANSAC) algorithm.

It should be further noted that when the neighboring image is processed by the terminal, the feature point selected by the terminal from the neighboring image and the feature point selected from the current image are in a one-to-one correspondence. The terminal calculates the primary position parameter of the neighboring image according to the first overlapped region in the neighboring image.

Step 502: Project the current image to a projection canvas according to the primary position parameter, to obtain an initial spliced image.

The terminal calculates, according to the primary position parameter of the current image, a transformation matrix used to project the current image to the projection canvas; calculates, according to the primary position parameter of the neighboring image, a transformation matrix used to project the neighboring image to the projection canvas; projects the current image to the projection canvas according to the transformation matrix corresponding to the current image, and projects the neighboring image to the projection canvas according to the transformation matrix corresponding to the neighboring image, to obtain the initial spliced image. As can be learned according to this projection process, the initial spliced image is obtained by splicing the current image and the neighboring image.

However, it should be noted that if three or more images need to be spliced, the similar processing process is performed. In this embodiment, for ease of description, only two images are used as an example for description.

In some embodiments, in this application, a manner of calculating the transformation matrix according to the position parameter includes, but is not limited to, one of rigid transformation, affine transformation, projection transformation, and nonlinear transformation, and certainly may be other transform manners. This is not limited in this embodiment.

Step 503: Select a partially overlapped region from a second overlapped region of the initial spliced image.

The second overlapped region is obtained by fusing the first overlapped region of the current image and the first overlapped region of the neighboring image. The image content in the second overlapped region is in the initial spliced image.

If the primary position parameter of the current image and the primary position parameter of the neighboring image that are calculated by the terminal are accurate and are applicable to the entire image, an effect of splicing the current image and the neighboring image is desirable. In this case, for the same image content in the first overlapped region of the current image and the neighboring image, the second overlapped region of the initial spliced image includes only one piece of the image content. The terminal may continue to perform the following steps or may end the procedure. This is not limited in this embodiment.

If the primary position parameter of the current image and the primary position parameter of the neighboring image that are calculated by the terminal are accurate and are inapplicable to the entire image, an effect of splicing the current image and the neighboring image is undesirable. In this case, for the same image content in the first overlapped region of the current image and the neighboring image, the second overlapped region of the initial spliced image includes at least two pieces of the image content. That is, the second overlapped region has flaws such as a double image, a ghost, a dashed edge, and a connection line misplacement. In this embodiment, the partially overlapped region is selected from the second overlapped region, and depths of depth planes of objects in the partially overlapped region are the same, so that the terminal may calculate, according to the partial position parameter corresponding to the partially overlapped region, the transformation matrix corresponding to each partially overlapped region, and project the current image and the neighboring image again according to the transformation matrix corresponding to each partially overlapped region, thereby improving a splicing effect of each partially overlapped region and a splicing effect of the entire image.

Generally, partial position parameters corresponding to partially overlapped regions of objects in depth planes with different depths in the current image are different. According to this property, in this embodiment, the terminal selects the partially overlapped region according to whether depths of the depth planes of objects are the same. In the same partially overlapped region selected by the terminal, depths of depth planes of objects are the same. Different partially overlapped regions are arranged along a tapering direction of depths of depth planes in the initial spliced image. For example, depths of depth planes of an image taper along a vertical direction, and the partially overlapped region selected by the terminal is arranged along the vertical direction of the initial spliced image. In this way, the selected partially overlapped region can reflect a change of depths of different depth planes. For another example, the depths of the depth planes of the image taper along a horizontal direction, and the partially overlapped region selected by the terminal is arranged along the horizontal direction of the initial spliced image. In this way, the selected partially overlapped region can reflect a change of depths of different depth planes. An example in which the depths of the depth planes of the image taper along the vertical direction is used below for description.

In some embodiments, there is at least one partially overlapped region selected by the terminal. This is not limited in this embodiment. In addition, in this embodiment, a shape of the partially overlapped region selected by the terminal is not limited. Exemplarily, the partially overlapped region is rectangular.

Step 504: Calculate a partial position parameter of a partial image region corresponding to the partially overlapped region in the current image.

The partial image region is determined according to a feature point matching a partial feature point in the partially overlapped region in the current image. That is, when determining the partial image region, the terminal first selects the partial feature point from the partially overlapped region of the initial spliced image, queries the feature point matching the partial feature point from the current image, and determines the partial image region according to the feature point.

The partial position parameter is used to indicate at least one of a rotation angle and a location of a camera during collection of the partial image region of the current image.

The calculating, by the terminal, a partial position parameter of a partial image region corresponding to the partially overlapped region in the current image includes: determining, in the current image, the partial image region corresponding to each partially overlapped region in the partially overlapped region; extracting a feature point from the partial image region; and calculating the partial position parameter according to the feature point by using a preset estimation algorithm.

The preset estimation algorithm used by the terminal to calculate the partial position parameter may be the same as or may be different from the preset algorithm used to calculate the primary position parameter. This is not limited in this implementation.

Step 505: Project the current image to the projection canvas again according to the primary position parameter and the partial position parameter, to obtain a target spliced image.

Because the terminal may calculate the transformation matrix of each partial image region according to the partial position parameter, when the partial image region is projected to the projection canvas again according to the transformation matrix, the partial image region in the current image and the neighboring image can achieve desirable registration. As a quantity of partial image regions increases, the entire image region of the current image and the neighboring image can achieve desirable registration, thereby improving a splicing effect of the target spliced image obtained by the terminal.

In conclusion, in the image splicing method provided in this embodiment, the partially overlapped region is selected from the initial spliced image obtained through projection according to the primary position parameter; the partial position parameter of the partial image region corresponding to the partially overlapped region in the current image is calculated, and the current image is projected to the projection canvas again according to the partial position parameter and the primary position parameter, to obtain the target spliced image. The technical solutions can resolve a problem that when a terminal obtains an initial spliced image by projecting a current image only according to a primary position parameter, because the primary position parameter may be inapplicable to the entire image, an overlapped region of the initial spliced image obtained by the terminal cannot achieve desirable registration and an image splicing effect is undesirable. Because the terminal projects the partial image region to the projection canvas again according to a partial position parameter of each partial image region, when there are many partial image regions, a region corresponding to each partial image region in the target spliced image obtained by the terminal can achieve desirable registration, and an image splicing effect can be improved.

In addition, the partially overlapped region arranged along the vertical direction of the initial spliced image is selected, so that the partially overlapped region selected by the terminal can satisfy a change of different depth planes, thereby improving accuracy of selecting the partially overlapped region by the terminal and indirectly improving an image splicing effect.

In some embodiments, to more clearly understand the method for selecting the partial region by the terminal in step 503 in the foregoing embodiment, the following describes, in detail, the method for selecting the partial region by the terminal.

A manner of selecting the partially overlapped region by the terminal includes, but is not limited to, the following.

In a first manner, the terminal selects a region whose difference between a maximum dislocation value and a minimum dislocation value is less than or equal to a preset value from the second overlapped region, to obtain the partially overlapped region.

Figure 6:
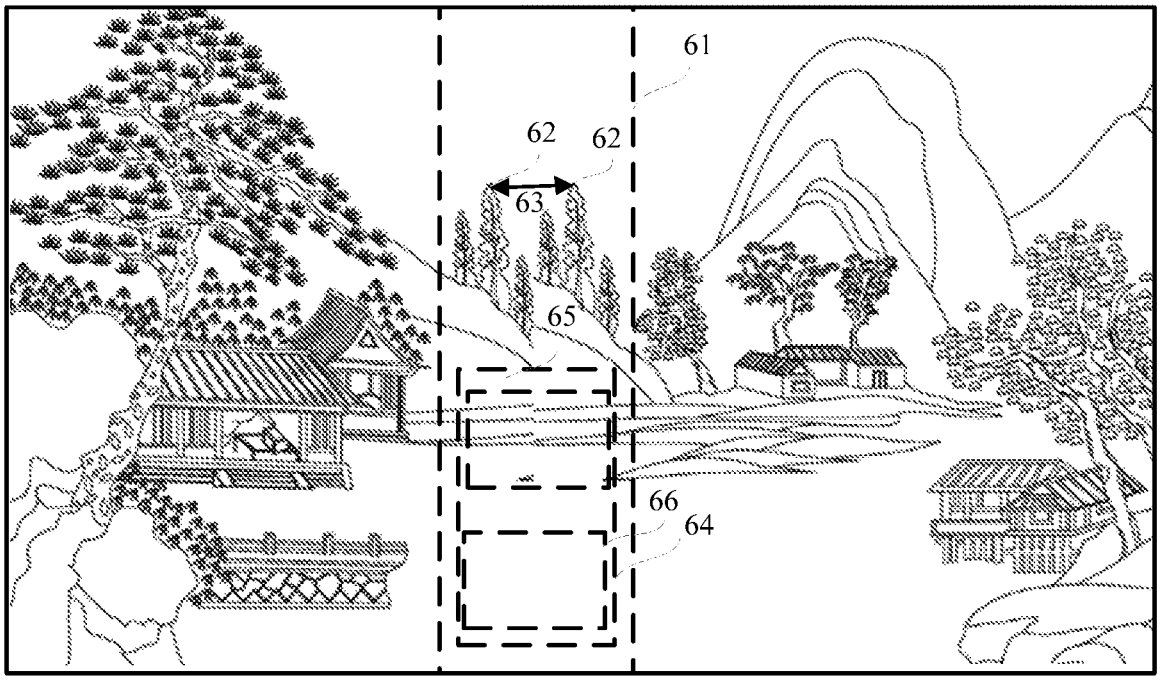
FIG. 6 is a schematic diagram of an initial spliced image according to an embodiment of this application.

The dislocation value is a distance between different locations of the initial spliced image when the same image content is displayed in the different locations. For example, the initial spliced image obtained by the terminal is shown in FIG. 6. As can be learned from FIG. 6, the image content 62 in the second overlapped region 61 is displayed in the different locations of the initial spliced image, and in this case, a distance 63 between the different locations is a dislocation value of the image content 62.

Because dislocation statuses of objects with a same depth of a depth plane usually are the same in the initial spliced image, the terminal selects the partially overlapped region with a same dislocation status, to indirectly obtain the partially overlapped region with a same depth of a depth plane. The preset value usually is small and approximates 0, and is, for example, 0.001, so that the terminal can select the partially overlapped region with basically the same dislocation status. This is not limited in this embodiment.

In a second manner, the terminal selects a region whose difference between a maximum dislocation value and a minimum dislocation value is less than or equal to a preset value from the second overlapped region, detects whether a region area of the region is greater than a preset area; and when the region area of the region is greater than the preset area, divides the region into at least two divided regions less than or equal to the preset area, and determines the divided region as the partially overlapped region.

In this manner, the terminal divides a same region with a same dislocation status and a large area into at least two divided regions. In this way, when the preset value is large, the region may be divided to improve accuracy of determining the partially overlapped region by the terminal.

In some embodiments, when the terminal divides the region into at least two divided regions less than or equal to the preset area, the obtained divided regions may include two divided regions with the same area, and/or include two divided regions with different areas. This is not limited in this embodiment. In addition, the divided regions obtained by the terminal may be spaced by a preset quantity of pixels along a vertical direction; or the divided regions obtained by the terminal may be seamlessly connected. This is not limited in this embodiment.

Assuming that the region whose area is greater than the preset area that is selected by the terminal is a region 64 in FIG. 6, after dividing the region 64, the terminal obtains partially overlapped regions 65 and 66, where the partially overlapped regions 65 and 66 have different areas and are discontinuous.

In a third manner, at least one scene content in the second overlapped region is identified, the region whose difference between the maximum dislocation value and the minimum dislocation value is less than or equal to the preset value is selected from each of the at least one scene content, and the region is determined as the partially overlapped region.

The same scene content is used to indicate a scene in a same spatial location. For example, the lamp, the ceiling, and the like on the top of a room are the same scene content; a desk, a chair, a person, and the like in the middle of the room are the same scene content; and the floor, the carpet, and the like at the bottom of the room are the same scene content.

Because depths of depth planes of objects of the same scene content usually are not greatly different, different scenes are first recognized, and the partially overlapped region with same depths of depth planes is selected from the same scene content, so that the terminal does not need to select the partially overlapped region from all second overlapped regions, thereby reducing resources consumed by the terminal to select the partially overlapped region.

In some embodiments, the terminal may further select the partially overlapped region in combination with the second manner and the third manner, or select the partially overlapped region in another manner. This is not limited in this embodiment.

In some embodiments, in this embodiment, the partially overlapped region may be manually selected according to the foregoing three implementations. This is not limited in this embodiment.

Assuming that partially overlapped regions selected by the terminal are shown in FIG. 7, a partially overlapped region 71 is sky, a partially overlapped region 72 is a tree, and partially overlapped regions 73 and 74 are roads.

In some embodiments, to more clearly understand the method for projecting the current image to the projection canvas again according to the primary position parameter and the partial position parameter by the terminal, to obtain the target spliced image in step 505 in the foregoing embodiment, the following describes step 505 in detail.

FIG. 8 is a flowchart of a method for obtaining a target spliced image according to an embodiment of this application. The method is applied to the image splicing system shown in FIG. 3, the method may be performed by the terminal 320, and the method may include the following several steps:

Step 801: Calculate a position parameter of each pixel in the first overlapped region according to the partial position parameter.

If the terminal assigns the primary position parameter or another position parameter set by the terminal to a position parameter of another region other than the partial image region in the first overlapped region after obtaining the partial position parameter of the partial image region, the target spliced image finally obtained by the terminal may have a breakage in the vertical direction. To avoid this problem, after obtaining the partial position parameter, the terminal needs to determine a position parameter of another region, to implement smooth transition of the position parameter in the vertical direction. This can avoid the problem that the target spliced image obtained by the terminal has a breakage in the vertical direction.

Figure 9:
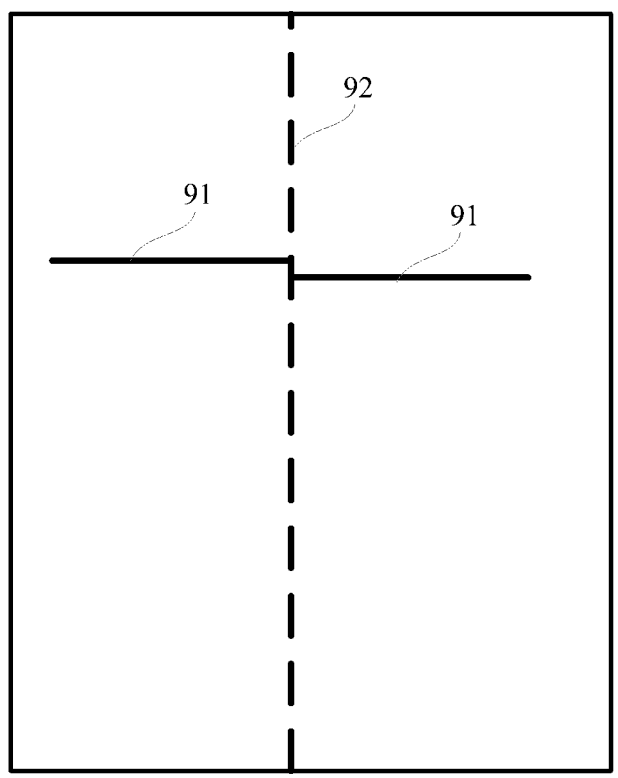
FIG. 9 is a schematic diagram of a spliced image with a breakage according to an embodiment of this application.

A breakage is a fault of a spliced image caused by a parallax between different cameras, and the parallax is a direction difference generated when the same object is observed from two points spaced by a distance. For example, if a same object is continuous in an actual setting, when different cameras shoot the object and a spliced image is obtained, the object is no longer continuous in the spliced image. FIG. 9 is a schematic diagram of a spliced image with a breakage. A line 91 is a continuous line in an actual setting. In the spliced image shown in FIG. 9, a line on the left side of the fault line 92 and a line on the right side of the fault line 92 are no longer continuous. That is, the spliced image has a breakage. The fault line 92 in FIG. 9 is only an example, and in an actual implementation, the spliced image may not necessarily have the fault line 92.

The calculating, by the terminal, a position parameter of each pixel in the first overlapped region according to the partial position parameter includes: providing a first parameter line passing through the partial image region; setting a position parameter of a first pixel that is on the first parameter line and that has an intersection set with the partial image region to the partial position parameter of the partial image region to which the first pixel belongs; if a second pixel that is on the first parameter line and that has no intersection set with the partial image region is located between a start point of the first parameter line and the first partial image region, determining a position parameter of the second pixel as a partial position parameter of the first partial image region; if the second pixel is located between an $i^{th}$ partial image region and an $(i+1)^{th}$ partial image region, calculating a position parameter of the second pixel through interpolation according to a partial position parameter of the $i^{th}$ partial image region and a partial position parameter of the $(i+1)^{th}$ partial image region; and if the second pixel is located between an end point of the first parameter line and the last partial image region, determining a position parameter of the second pixel as a partial position parameter of the last partial image region; and assigning a position parameter of each pixel on the first parameter line to all pixels in the same pixel row as the pixel in the first overlapped region, to obtain the position parameter of each pixel in the first overlapped region, where i is a positive integer.

When depths of depth planes of an image taper along the vertical direction, the first parameter line is in parallel with the vertical direction of the current image; and when depths of depth planes of an image taper along the horizontal direction, the first parameter line is in parallel with the horizontal direction of the current image.

A number of the partial image region is determined according to a sequence of sequentially passing through partial image regions by the first parameter line along a direction from a start point to an end point. For example, an $i^{th}$ partial image region is an $i^{th}$ partial image region along the direction from the start point to the end point.

In some embodiments, the start point and the end point are separately located at two ends of the first parameter line. In this embodiment, locations of the start point and the end point are not limited. Exemplarily, the start point is an endpoint above the first parameter line, and the start point is an endpoint below the first parameter line.

In some embodiments, in this embodiment, a type of interpolation is not limited, and exemplarily, the interpolation is linear interpolation.

Figure 10:
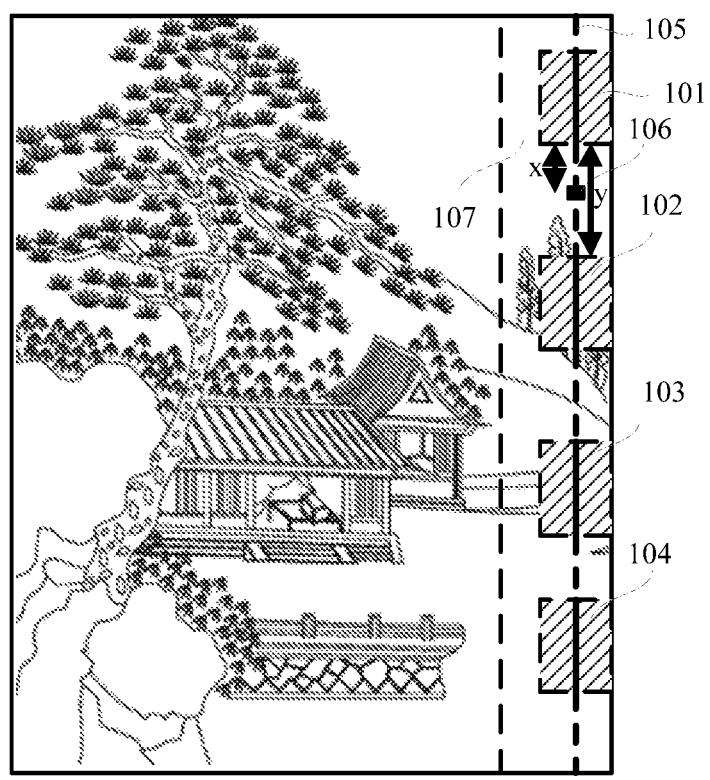
FIG. 10 is a schematic diagram of vertical smooth transition of a position parameter according to an embodiment of this application.

Referring to FIG. 10, after the terminal determines partial image regions 101, 102, 103, and 104 and a partial position parameter of each partial image region, the perpendicular first parameter line 105 is provided, where the first parameter line 105 passes through the partial image regions 101, 102, 103, and 104.

For pixels (a bold-line part in the partial image region 101 in the figure) intersecting with the partial image region 101 on the first parameter line 105, position parameters of the pixels are partial position parameters of the partial image region 101. For pixels (a bold-line part in the partial image region 102 in the figure) intersecting with the partial image region 102 on the first parameter line 105, position parameters of the pixels are partial position parameters of the partial image region 102. For pixels (a bold-line part in the partial image region 103 in the figure) intersecting with the partial image region 103 on the first parameter line 105, position parameters of the pixels are partial position parameters of the partial image region 103. For pixels (a bold-line part in the partial image region 104 in the figure) intersecting with the partial image region 104 on the first parameter line 105, position parameters of the pixels are partial position parameters of the partial image region 104.

For pixels (a dashed-line part above the partial image region 101 in the figure) between the start point of the first parameter line 105 and the partial image region 101, position parameters of the pixels are partial position parameters of the partial image region 101.

For pixels (a dashed-line part below the partial image region 104 in the figure) between the end point of the first parameter line 105 and the partial image region 104, position parameters of the pixels are partial position parameters of the partial image region 104.

For pixels (a dashed-line part between the partial image region 101 and the partial image region 102 in the figure) between the partial image regions 101 and 102 on the first parameter line 105, position parameters of the pixels are calculated according to linear interpolation. That is, a partial position parameter of the pixel 106=(x/y)*the partial position parameter of the partial image region 102+(y−x)/y*the partial position parameter of the partial image region 101. x is a minimum pixel interval from the pixel 106 to the partial image region 101, and y is a minimum pixel interval between the partial image regions 101 and 102.

For pixels (a dashed-line part between the partial image region 102 and the partial image region 103 in the figure) between the partial image regions 102 and 103 on the first parameter line 105, position parameters of the pixels are calculated according to linear interpolation. A calculation manner is the same as that described in the foregoing paragraph, and details are not described herein in this embodiment.

For pixels (a dashed-line part between the partial image region 103 and the partial image region 104 in the figure) between the partial image regions 103 and 104 on the first parameter line 105, position parameters of the pixels are calculated according to linear interpolation. A calculation manner is the same as that described in the foregoing paragraph, and details are not described herein in this embodiment.

After obtaining a position parameter of each pixel on the first parameter line 105, the terminal assigns the position parameter of each pixel on the first parameter line 105 to all pixels in the same pixel row as the pixel in the first overlapped region 107. That is, position parameters of each row of pixels in the first overlapped region 107 are the same, and a position parameter of each pixel in the first overlapped region is obtained.

Step 802: Generate, according to the position parameter of each pixel, a first transformation matrix corresponding to the first overlapped region.

Because position parameters of pixels in the vertical direction of the first overlapped region taper, when the terminal projects the current image to the projection canvas according to the first transformation matrix obtained according to the position parameter, the problem of a breakage of the target spliced image in the vertical direction can be avoided.

Step 803: Generate a second transformation matrix of another image region other than the first overlapped region in the current image according to the primary position parameter.

If the terminal generates a second transformation matrix of another image region only according to the primary position parameter, when the primary position parameter is greatly different from a position parameter of each pixel in the first overlapped region, the target spliced image obtained by the terminal may have a problem of a breakage in the horizontal direction. To avoid this problem, after obtaining the position parameter of each pixel in the first overlapped region, the terminal needs to determine a transition region outside the first overlapped region, and determine a position parameter of each pixel in the transition region, to implement smooth transition of position parameters in the horizontal direction. This can avoid the problem of a breakage that is of the target spliced image obtained by the terminal and that is in the horizontal direction.

The generating, by the terminal, a second transformation matrix of another image region other than the first overlapped region in the current image according to the primary position parameter includes: providing a second parameter line outside the first overlapped region of the current image, where the second parameter line is in parallel with the first parameter line; setting a position parameter of each third pixel on the second parameter line to the primary position parameter; determining an edge line of the first overlapped region, where a position parameter of each fourth pixel on the edge line is determined according to a position parameter of each pixel on the first parameter line; calculating a position parameter of a pixel located between the second parameter line and the edge line, through interpolation according to position parameters of a third pixel and a fourth pixel on the same pixel row as the pixel, to obtain a position parameter of each pixel in a transition region between the second parameter line and the edge line; and generating the second transformation matrix of another image region other than the first overlapped region in the current image according to the position parameter of each pixel in the transition region and the primary position parameter.

The generating a second transformation matrix of another image region other than the first overlapped region in the current image according to a position parameter of each pixel in the transition region and the primary position parameter is: generating a second transformation matrix of the transition region according to a position parameter of each pixel in the transition region; and generating the second transformation matrix of a region other than the transition region in the another image region according to a primary position parameter of the region, to obtain the second transformation matrix of the another image region.

In this embodiment, a location of the second parameter line is not limited. For example, the second parameter line is located in the middle of the current image, and the current image is divided into left and right regions with the same areas.

Figure 11:
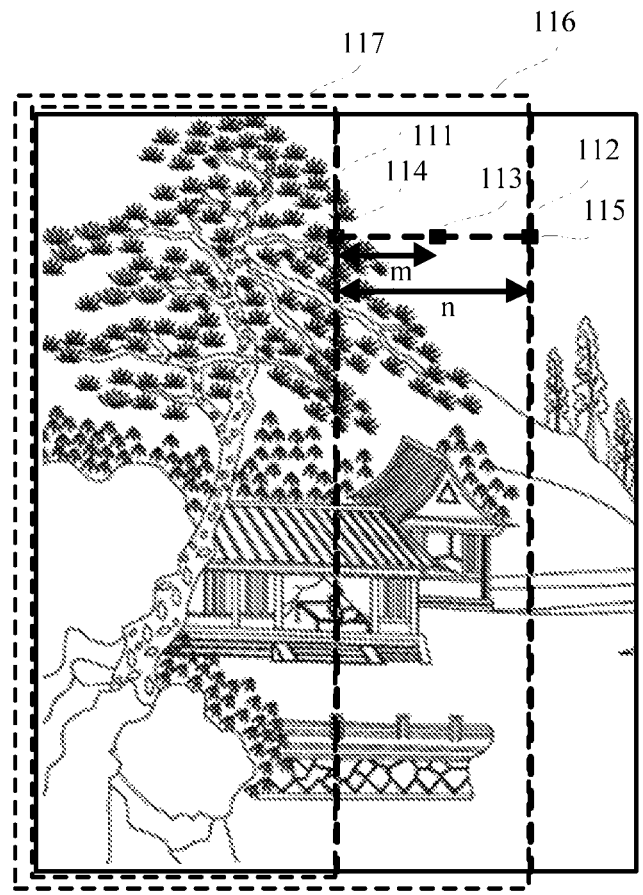
FIG. 11 is a schematic diagram of horizontal smooth transition of a position parameter according to an embodiment of this application.

Referring to FIG. 11, after the terminal determines a position parameter of each pixel in the first overlapped region, a vertical second parameter line 111 is provided. A position parameter of each third pixel on the second parameter line 111 is the primary position parameter. The terminal determines an edge line 112 of the first overlapped region, and a position parameter of each fourth pixel on the edge line 112 is determined according to the manner shown in FIG. 9. A region between the second parameter line 111 and the edge line 112 is the transition region.

A position parameter of a pixel 113 in the transition region is calculated according to position parameters of a third pixel 114 and a fourth pixel 115 in the same pixel row as the pixel 113 through interpolation. That is, the partial position parameter of the pixel 113=(m/n)*the partial position parameter of the third pixel 115+(n−m)/n*the partial position parameter of the fourth pixel 114. m is a pixel interval from the pixel 113 to the third pixel 114, and n is a pixel interval between the third pixel 114 and the fourth pixel 115. A position parameter of another pixel in the transition region is also calculated by using the method, to obtain a position parameter of each pixel in the transition region.

The terminal generates the second transformation matrix of the transition region according to a position parameter of each pixel in the transition region; and generates the second transformation matrix of a region 117 according to a primary position parameter of the region 117 other than the transition region in another image region 116, to obtain the second transformation matrix of the another image region 116.

Step 804: Project the current image to the projection canvas according to the first transformation matrix and the second transformation matrix, to obtain a target spliced image.

The terminal projects the current image to the projection canvas one pixel after another according to the first transformation matrix of the first overlapped region and the second transformation matrix of the another image region, and similarly projects the neighboring image to the projection canvas, to obtain the target spliced image.

The terminal projects the current image according to the partial position parameter of the partial image region, and transitions a position parameter of each pixel in the first overlapped region and the transition region. In this way, a splicing effect of the target spliced image obtained by the terminal is desirable, and the problem of a breakage does not exist in the horizontal direction and the vertical direction.

In some embodiments, when the target spliced image obtained by the terminal does not achieve an expected splicing effect, the partially overlapped region may be selected from the target spliced image again, that is, step 503 is performed again. This is not limited in this embodiment.

In conclusion, in the image splicing method provided in this embodiment, a position parameter of another region is determined after the partial position parameter of the partial image region is obtained, to implement smooth transition of position parameters in the vertical direction, avoid that the target spliced image obtained by the terminal has the problem of a breakage in the vertical direction, and improve an image splicing effect.

In addition, a transition region is determined outside the first overlapped region, and a position parameter of each pixel in the transition region is determined, to implement smooth transition of position parameters in the horizontal direction, avoid that the target spliced image obtained by the terminal has the problem of a breakage in the horizontal direction, and improve an image splicing effect.

The following provides apparatus embodiments of this application that may be used to implement the method embodiments of this application. For details not disclosed in the apparatus embodiments of this application, refer to the method embodiments of this application.

Figure 12:
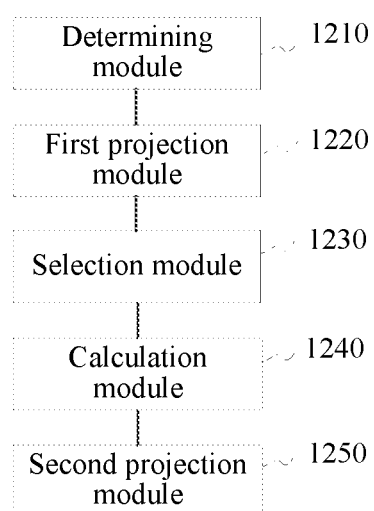
FIG. 12 is a block diagram of an image splicing apparatus according to an embodiment of this application.

FIG. 12 is a block diagram of an image splicing apparatus according to an embodiment of this application. The apparatus has a function for implementing the foregoing method embodiments, and the function may be implemented by hardware or may be implemented by hardware executing corresponding software. The apparatus may be the terminal 320 in the image splicing system shown in FIG. 3, and the apparatus may include: a determining module 1210, a first projection module 1220, a selection module 1230, a calculation module 1240, and a second projection module 1250, where the determining module 1210 is configured to perform step 501; the first projection module 1220 is configured to perform step 502; the selection module 1230 is configured to perform step 503; the calculation module 1240 is configured to perform step 504; and the second projection module 1250 is configured to perform step 505.

In some embodiments, the selection module 1230 is further configured to: select a region whose difference between a maximum dislocation value and a minimum dislocation value is less than or equal to a preset value from the second overlapped region, to obtain the partially overlapped region, where the partially overlapped region is arranged along a perpendicular direction of the initial spliced image, and the dislocation value is a distance between different locations of the initial spliced image when same image content is displayed in the different locations.

In some embodiments, the apparatus further includes: a detection module and a division module, where the detection module is configured to detect whether the region is larger than a preset value; and the division module is configured to: when the region is larger than the preset area, divide the region into at least two divided regions less than or equal to the preset area, and determine the divided region as the partially overlapped region.

In some embodiments, the apparatus further includes: a scene determining module, configured to determine at least one scene content in the second overlapped region, where same scene content is used to indicate a scene in a same spatial location; and the selection module 1230 is further configured to: select a region whose difference between a maximum dislocation value and a minimum dislocation value is less than or equal to a preset value from each of the at least one scene content, and determine the region as the partially overlapped region.

In some embodiments, the second projection module 1250 includes: a calculation unit, a first generation unit, a second generation unit, and a projection unit, where the calculation unit is configured to perform step 801; the first generation unit is configured to perform step 802; the second generation unit is configured to perform step 803; and the projection unit is configured to perform step 804.

In some embodiments, the calculation unit is specifically configured to: provide a first parameter line passing through the partial image region, where the first parameter line is in parallel with a perpendicular direction of the current image; set a position parameter of a first pixel that is on the first parameter line and that has an intersection set with the partial image region to the partial position parameter of the partial image region to which the first pixel belongs; if a second pixel that is on the first parameter line and that has no intersection set with the partial image region is located between a start point of the first parameter line and the first partial image region, determine a position parameter of the second pixel as a partial position parameter of the first partial image region; if the second pixel is located between an $i^{th}$ partial image region and an $(i+1)^{th}$ partial image region, calculate a position parameter of the second pixel through interpolation according to a partial position parameter of the $i^{th}$ partial image region and a partial position parameter of the $(i+1)^{th}$ partial image region; and if the second pixel is located between an end point of the first parameter line and the last partial image region, determine a position parameter of the second pixel as a partial position parameter of the last partial image region, where i is a positive integer; and assign a position parameter of each pixel on the first parameter line to all pixels in the same pixel row as the pixel in the first overlapped region, to obtain the position parameter of each pixel in the first overlapped region.

In some embodiments, the second generation unit is specifically configured to: provide a second parameter line outside the first overlapped region of the current image, where the second parameter line is in parallel with the first parameter line; set a position parameter of each third pixel on the second parameter line to the primary position parameter; determine an edge line of the first overlapped region, where a position parameter of each fourth pixel on the edge line is determined according to a position parameter of each pixel on the first parameter line; calculate a position parameter of a pixel located between the second parameter line and the edge line, through interpolation according to position parameters of a third pixel and a fourth pixel on the same pixel row as the pixel, to obtain a position parameter of each pixel in a transition region between the second parameter line and the edge line; and generate the second transformation matrix of another image region other than the first overlapped region in the current image according to the position parameter of each pixel in the transition region and the primary position parameter.

In some embodiments, the calculation module 1240 includes: a determining unit, an extraction unit, and an estimation unit.

The determining unit is configured to determine, in the target image, the partial image region corresponding to each partially overlapped region in the partially overlapped region.

The extraction unit is configured to extract a feature point from the partial image region.

The estimation unit is configured to calculate the partial position parameter according to the feature point by using a preset estimation algorithm.

For specifics, refer to the foregoing method embodiments.

Figure 13:
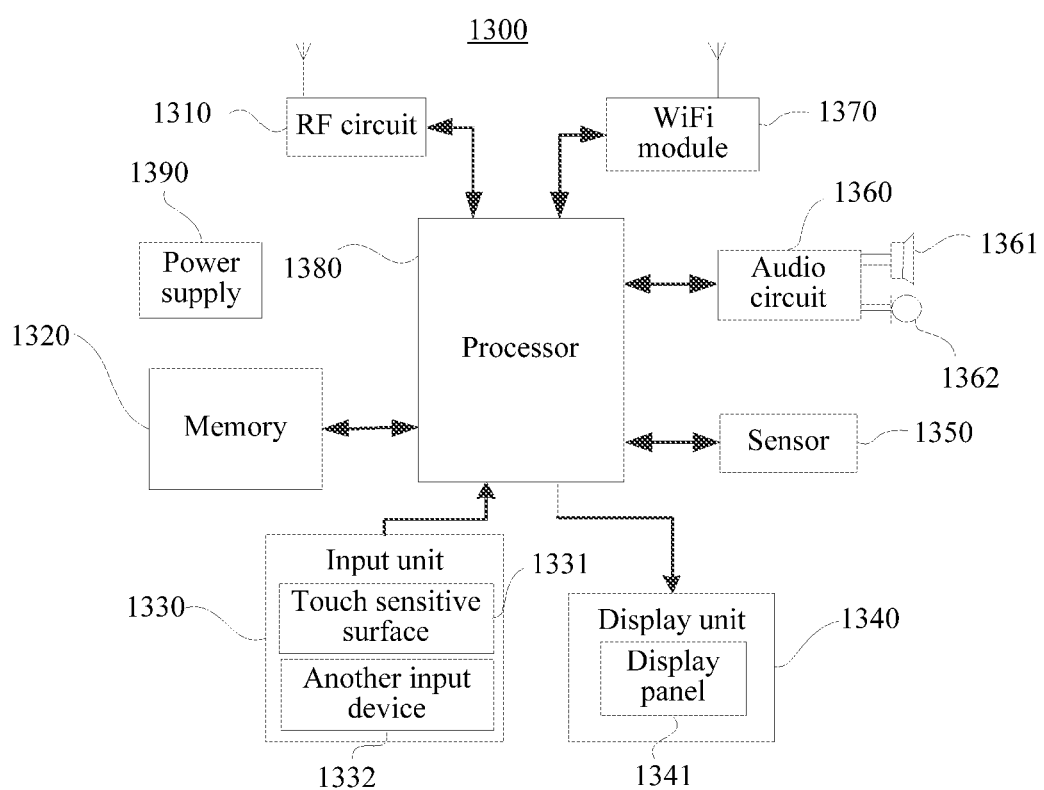
FIG. 13 is a schematic structural diagram of a terminal according to an embodiment of this application.

FIG. 13 is a schematic structural diagram of a terminal according to an embodiment of this application. The terminal 1300 is configured to perform the image splicing method provided in the foregoing embodiment. Specifics are as follows:

The terminal 1300 may include components such as a radio frequency (RF) circuit 1310, a memory 1320 including one or more computer-readable storage mediums, an input unit 1330, a display unit 1340, a sensor 1350, an audio circuit 1360, a wireless fidelity (WiFi) module 1370, a processor 1380 including one or more processing cores, and a power supply 1390. A person skilled in the art may understand that the structure of the terminal shown in FIG. 13 does not constitute a limitation to the terminal, and the terminal may include more components or fewer components than those shown in the figure, or some components may be combined, or a different component deployment may be used.

The RF circuit 1310 may be configured to receive and send signals during an information receiving and sending process or a call process. Particularly, the RF circuit 1310 receives downlink information from a base station, then delivers the downlink information to one or more processors 1380 for processing, and sends related uplink data to the base station. Generally, the RF circuit 1310 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1310 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1320 may be configured to store a software program and module. The processor 1380 runs the software program and module stored in the memory 1320, to implement various functional applications and data decryption. The memory 1320 may mainly include a program storage region and a data storage region. The program storage region may store an operating system, an application program required by at least one function (such as a sound playback function and an image display function), and the like. The data storage region may store data (such as audio data and an address book) created according to use of the terminal 1300, and the like. In addition, the memory 1320 may include a high speed random access memory, and may also include a non-volatile memory such as at least one magnetic disk storage device, a flash memory, or another volatile solid-state storage device. Correspondingly, the memory 1320 may further include a memory controller to provide access to the memory 1320 by the processor 1380 and the input unit 1330.

The input unit 1330 may be configured to receive input character information, and generate a keyboard, mouse, joystick, optical, or track ball signal input related to the user setting and function control. Specifically, the input unit 1330 may include an image input device 1331 and another input device 1332. The image input device 1331 may be a camera or may be a photoelectric scanning device. In addition to the image input device 1331, the input unit 1330 may further include another input device 1332. Specifically, another input device 1332 may include, but is not limited to, one or more of a physical keyboard, a functional key (such as a volume control key or a switch key), a track ball, a mouse, and a joystick.

The display unit 1340 may be configured to display information input by the user or information provided for the user, and various graphical user interfaces of the terminal 1300. The graphical user interfaces may be formed by a graph, a text, an icon, a video, or any combination thereof. The display unit 1340 may include a display panel 1341. In some embodiments, the display panel 1341 may be configured by using a liquid crystal display (LCD), an organic light-emitting diode (OLED), or the like.

The terminal 1300 may further include at least one sensor 1350, such as an optical sensor, a motion sensor, and other sensors. Specifically, the optical sensor may include an ambient light sensor and a proximity sensor. The ambient light sensor can adjust luminance of the display panel 1341 according to brightness of the ambient light. The proximity sensor may switch off the display panel 1341 and/or backlight when the terminal 1300 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1300, are not further described herein.

The audio circuit 1360, a loudspeaker 1361, and a microphone 1362 may provide audio interfaces between the user and the terminal 1300. The audio circuit 1360 may convert received audio data into an electric signal and transmit the electric signal to the loudspeaker 1361. The loudspeaker 1361 converts the electric signal into a sound signal for output. On the other hand, the microphone 1362 converts a collected sound signal into an electric signal. The audio circuit 1360 receives the electric signal and converts the electric signal into audio data, and outputs the audio data to the processor 1380 for processing. Then, the processor 1380 sends the audio data to, for example, another terminal by using the RF circuit 1310, or outputs the audio data to the memory 1320 for further processing. The audio circuit 1360 may further include an earplug jack, to provide communication between a peripheral earphone and the terminal 1300.

WiFi is a short distance wireless transmission technology. The terminal 1300 may help, by using the WiFi module 1370, the user to receive and send e-mails, browse a webpage, access streaming media, and so on, which provides wireless broadband Internet access for the user. Although FIG. 13 shows the WiFi module 1370, it may be understood that the WiFi module 1370 is not a necessary component of the terminal 1300, and when required, the WiFi module 1370 may be omitted as long as the scope of the essence of the present disclosure is not changed.

The processor 1380 is the control center of the terminal 1300, and is connected to various parts of the mobile phone by using various interfaces and lines. By running or executing the software program and/or module stored in the memory 1320, and invoking data stored in the memory 1320, the processor 1380 performs various functions and data processing of the terminal 1300, thereby performing overall monitoring on the mobile phone. In some embodiments, the processor 1380 may include one or more processing cores. Preferably, the processor 1380 may integrate an application processor and a modem. The application processor mainly processes an operating system, a user interface, an application program, and the like. The modem mainly processes wireless communication. It may be understood that the foregoing modem may also not be integrated into the processor 1380.

The terminal 1300 further includes the power supply 1390 (such as a battery) for supplying power to the components. Preferably, the power supply may be logically connected to the processor 1380 by using a power management system, thereby implementing functions such as charging, discharging and power consumption management by using the power management system. The power supply 1390 may further include one or more of a direct current or alternating current power supply, a re-charging system, a power failure detection circuit, a power supply converter or inverter, a power supply state indicator, and any other components.

Although not shown in the figure, the terminal 1300 may further include a Bluetooth module and the like, which are not further described herein.

Specifically, in this embodiment, the terminal 1300 further includes a memory and one or more programs. The one or more programs are stored in the memory and configured to be executed by one or more processors. The one or more programs contain instructions used for implementing the foregoing image splicing method.

The embodiments of this application further provide a computer-readable storage medium. The computer storage medium stores at least one instruction, and the at least one instruction is loaded and executed by the processor to perform the image splicing method provided in the foregoing method embodiments.

The embodiments of this application further provide a computer program product. The computer program product stores at least one instruction, and the at least one instruction is loaded and executed by the processor to perform the image splicing method provided in the foregoing method embodiments.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated units may be implemented in a form of hardware or may be implemented in a form of a software functional unit.

If implemented in the form of software functional units and sold or used as an independent product, the integrated units may be stored in a computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, a network device, or the like) to perform all or a part of steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

It should be understood that "a plurality of" described in this specification indicates two or more. "And/or" describes an association relationship between associated objects and represents that three relationships may exist. For example, A and/or B may represent the following three cases: only A exists, both A and B exist, and only B exists. The character "/" generally indicates an "or" relationship between the associated objects.

A person of ordinary skill in the art may understand that all or some of the steps of the embodiments may be implemented by hardware or a program instructing related hardware. The program may be stored in a computer readable storage medium. The storage medium may include: a read-only memory, a magnetic disk, or an optical disc.

The foregoing descriptions are merely exemplary embodiments of this application, but are not intended to limit this application. Any modification, equivalent replacement, and improvement made without departing from the spirit and principle of this application shall fall within the protection scope of this application.

What is claimed is:

1. An image splicing method implemented by a terminal, the method comprising:
    determining, by the terminal, a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image;
    projecting, by the terminal, the current image to a projection canvas according to the primary position parameter to obtain an initial spliced image, the initial spliced image being obtained by splicing the current image and the neighboring image;
    selecting, by the terminal, a partially overlapped region from a second overlapped region of the initial spliced image, the second overlapped region being obtained by fusing the first overlapped region of the current image and the first overlapped region of the neighboring image, and depths of depth planes of objects in the partially overlapped region being the same;
    calculating, by the terminal, a partial position parameter of a partial image region corresponding to the partially overlapped region in the current image, the partial position parameter being used to indicate at least one of a rotation angle and a location of the camera during collection of the partial image region of the current image; and
    projecting, by the terminal, the current image to the projection canvas again according to the primary position parameter and the partial position parameter, to obtain a target spliced image.

2. The method according to claim 1, wherein the selecting a partially overlapped region from a second overlapped region of the initial spliced image comprises:
    selecting a region whose difference between a maximum dislocation value and a minimum dislocation value is less than or equal to a threshold value from the second overlapped region, to obtain the partially overlapped region, wherein
    the partially overlapped region is arranged according to a tapering direction of a depth of a depth plane of the initial spliced image, and the dislocation value is a distance between different locations of an object displayed in the initial spliced image.

3. The method according to claim 2, after the selecting a region whose difference between a maximum dislocation value and a minimum dislocation value is less than or equal to a threshold value from the second overlapped region, further comprising:
    detecting whether the region is larger than a threshold value; and
    if the region is larger than the threshold value, dividing the region into at least two divided regions less than or equal to the threshold value, and determining the divided region as the partially overlapped region.

4. The method according to claim 2, before the selecting a region whose difference between a maximum dislocation value and a minimum dislocation value is less than or equal to a threshold value from the second overlapped region, further comprising:
    determining at least one scene content in the second overlapped region, wherein same scene content is used to indicate a scene in a same spatial location; and
    selecting, from each of the at least one scene content, a region whose difference between a maximum dislocation value and a minimum dislocation value is less than or equal to a threshold value, and determining the region as the partially overlapped region.

5. The method according to claim 1, wherein the projecting the current image to the projection canvas again according to the primary position parameter and the partial position parameter, to obtain a target spliced image comprises:

calculating a position parameter of each pixel in the first overlapped region according to the partial position parameter;

generating, according to the position parameter of each pixel, a first transformation matrix corresponding to the first overlapped region;

generating a second transformation matrix of another image region other than the first overlapped region in the current image according to the primary position parameter; and projecting the current image to the projection canvas according to the first transformation matrix and the second transformation matrix, to obtain the target spliced image.

6. The method according to claim 5, wherein the calculating a position parameter of each pixel in the first overlapped region according to the partial position parameter comprises:

providing a first parameter line passing through the partial image region;

setting a position parameter of a first pixel that is on the first parameter line and that has an intersection set with the partial image region to the partial position parameter of the partial image region to which the first pixel belongs;

if a second pixel that is on the first parameter line and that has no intersection set with the partial image region is located between a start point of the first parameter line and the first partial image region, determining a position parameter of the second pixel as a partial position parameter of the first partial image region;

if the second pixel is located between an $i^{th}$ partial image region and an $(i+1)^{th}$ partial image region, calculating a position parameter of the second pixel through interpolation according to a partial position parameter of the $i^{th}$ partial image region and a partial position parameter of the $(i+1)^{th}$ partial image region;

if the second pixel is located between an end point of the first parameter line and the last partial image region, determining a position parameter of the second pixel as a partial position parameter of the last partial image region, wherein i is a positive integer; and assigning a position parameter of each pixel on the first parameter line to all pixels in the same pixel row as the pixel in the first overlapped region, to obtain the position parameter of each pixel in the first overlapped region.

7. The method according to claim 6, wherein the generating a second transformation matrix of another image region other than the first overlapped region in the current image according to the primary position parameter comprises:

providing a second parameter line outside the first overlapped region of the current image, wherein the second parameter line is in parallel with the first parameter line;

setting a position parameter of each third pixel on the second parameter line to the primary position parameter;

determining an edge line of the first overlapped region, wherein a position parameter of each fourth pixel on the edge line is determined according to a position parameter of each pixel on the first parameter line;

calculating a position parameter of a pixel located between the second parameter line and the edge line, through interpolation according to position parameters of a third pixel and a fourth pixel on the same pixel row as the pixel, to obtain a position parameter of each pixel in a transition region between the second parameter line and the edge line; and generating the second transformation matrix of another image region other than the first overlapped region in the current image according to the position parameter of each pixel in the transition region and the primary position parameter.

8. The method according to claim 1, wherein the calculating a partial position parameter of a partial image region corresponding to the partially overlapped region in the current image comprises:

determining, in the current image, the partial image region corresponding to each partially overlapped region in the partially overlapped region;

extracting a feature point from the partial image region; and calculating the partial position parameter according to the feature point by using a threshold estimation algorithm.

9. An image splicing apparatus, the apparatus comprising:

a determining module, configured to determine a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image;

a first projection module, configured to project the current image to a projection canvas according to the primary position parameter obtained by the determining module, to obtain an initial spliced image, the initial spliced image being obtained by splicing the current image and the neighboring image;

a selection module, configured to select a partially overlapped region from a second overlapped region of the initial spliced image obtained by the first projection module, the second overlapped region being obtained by fusing the first overlapped region of the current image and the first overlapped region of the neighboring image, and depths of depth planes of objects in the partially overlapped region being the same;

a calculation module, configured to calculate a partial position parameter of a partial image region corresponding to the partially overlapped region selected by the selection module in the current image, the partial position parameter being used to indicate at least one of a rotation angle and a location of the camera during collection of the partial image region of the current image; and a second projection module, configured to project the current image to the projection canvas again according to the primary position parameter and the partial position parameter calculated by the calculation module, to obtain a target spliced image.

10. The apparatus according to claim 9, wherein the selection module is further configured to:

select a region whose difference between a maximum dislocation value and a minimum dislocation value is less than or equal to a threshold value from the second overlapped region, to obtain the partially overlapped region, wherein the partially overlapped region is arranged along a tapering direction of a depth of a depth plane of the initial spliced image, and the dislocation value is a distance between different locations of the initial spliced image when same image content is displayed in the different locations.

11. The apparatus according to claim 10, wherein the apparatus further comprises:
   a detection module, configured to detect whether the region is larger than a threshold area; and
   a division module, configured to: when the region is larger than the threshold area, divide the region into at least two divided regions less than or equal to the threshold area, and determine the divided region as the partially overlapped region.

12. The apparatus according to claim 10, further comprising:
   a scene determining module, configured to determine at least one scene content in the second overlapped region, wherein same scene content is used to indicate a scene in a same spatial position; and
   the selection module is further configured to select a region whose difference between a maximum dislocation value and a minimum dislocation value is less than or equal to a threshold value from each of the at least one scene content, and determine the region as the partially overlapped region.

13. The apparatus according to claim 9, wherein the second projection module comprises:
   a calculation unit, configured to calculate a position parameter of each pixel in the first overlapped region according to the partial position parameter;
   a first generation unit, configured to generate, according to the position parameter of each pixel, a first transformation matrix corresponding to the first overlapped region;
   a second generation unit, configured to generate a second transformation matrix of another image region other than the first overlapped region in the current image according to the primary position parameter; and
   a projection unit, configured to project the current image to the projection canvas according to the first transformation matrix and the second transformation matrix, to obtain the target spliced image.

14. The apparatus according to claim 13, wherein the calculation unit is configured to:
   provide a first parameter line passing through the partial image region;
   set a position parameter of a first pixel that is on the first parameter line and that has an intersection set with the partial image region to the partial position parameter of the partial image region to which the first pixel belongs;
   if a second pixel that is on the first parameter line and that has no intersection set with the partial image region is located between a start point of the first parameter line and the first partial image region, determine a position parameter of the second pixel as a partial position parameter of the first partial image region;
   if the second pixel is located between an $i^{th}$ partial image region and an $(i+1)^{th}$ partial image region, calculate a position parameter of the second pixel through interpolation according to a partial position parameter of the $i^{th}$ partial image region and a partial position parameter of the $(i+1)^{th}$ partial image region;
   if the second pixel is located between an end point of the first parameter line and the last partial image region, determine a position parameter of the second pixel as a partial position parameter of the last partial image region, wherein i is a positive integer; and
   assign a position parameter of each pixel on the first parameter line to all pixels in the same pixel row as the pixel in the first overlapped region, to obtain the position parameter of each pixel in the first overlapped region.

15. The apparatus according to claim 14, wherein the second generation unit is configured to:
   provide a second parameter line outside the first overlapped region of the current image, wherein the second parameter line is in parallel with the first parameter line;
   set a position parameter of each third pixel on the second parameter line to the primary position parameter;
   determine an edge line of the first overlapped region, wherein a position parameter of each fourth pixel on the edge line is determined according to a position parameter of each pixel on the first parameter line;
   calculate a position parameter of a pixel located between the second parameter line and the edge line, through interpolation according to position parameters of a third pixel and a fourth pixel on the same pixel row as the pixel, to obtain a position parameter of each pixel in a transition region between the second parameter line and the edge line; and
   generate the second transformation matrix of another image region other than the first overlapped region in the current image according to the position parameter of each pixel in the transition region and the primary position parameter.

16. The apparatus according to claim 9, wherein the calculation module comprises:
   a determining unit, configured to determine, in the current image, the partial image region corresponding to each partially overlapped region in the partially overlapped region;
   an extraction unit, configured to extract a feature point from the partial image region; and
   an estimation unit, configured to calculate the partial position parameter according to the feature point by using a threshold estimation algorithm.

17. A non-transitory computer-readable storage medium storing computer program instructions executable by at least one processor to perform:
   determining a primary position parameter of a current image according to a first overlapped region in the current image, the primary position parameter comprising at least one of a rotation angle and a location of a camera during collection of the current image, and the first overlapped region being a region in which image content of the current image is the same as that of a neighboring image;
   projecting the current image to a projection canvas according to the primary position parameter, to obtain an initial spliced image, the initial spliced image being obtained by splicing the current image and the neighboring image;
   selecting a partially overlapped region from a second overlapped region of the initial spliced image, the second overlapped region being obtained by fusing the first overlapped region of the current image and the first overlapped region of the neighboring image, and depths of depth planes of objects in the partially overlapped region being the same;
   calculating a partial position parameter of a partial image region corresponding to the partially overlapped region in the current image, the partial position parameter being used to indicate at least one of a rotation angle and a location of the camera during collection of the partial image region of the current image; and projecting the current image to the projection canvas again according to the primary position parameter and the partial position parameter, to obtain a target spliced image.

18. The storage medium according to claim 17, wherein the selecting a partially overlapped region from a second overlapped region of the initial spliced image comprises:

selecting a region whose difference between a maximum dislocation value and a minimum dislocation value is less than or equal to a threshold value from the second overlapped region, to obtain the partially overlapped region, wherein the partially overlapped region is arranged along a tapering direction of a depth of a depth plane of the initial spliced image, and the dislocation value is a distance between different locations of the initial spliced image when same image content is displayed in the different locations.

19. The storage medium according to claim 17, wherein the computer program instructions further cause the at least one processor to perform:

detecting whether the region is larger than a threshold value; and if the region is larger than the threshold value, dividing the region into at least two divided regions less than or equal to the threshold value, and determining the divided region as the partially overlapped region.

20. The storage medium according to claim 17, wherein the computer program instructions further cause the at least one processor to perform:

determining at least one scene content in the second overlapped region, wherein same scene content is used to indicate a scene in a same spatial location; and the selecting a region whose difference between a maximum dislocation value and a minimum dislocation value is less than or equal to a threshold value from the overlapped region comprises:

selecting a region whose difference between a maximum dislocation value and a minimum dislocation value is less than or equal to a threshold value from each of the at least one scene content, and determining the region as the partially overlapped region.

* * * * *